United States Patent
Cao

(10) Patent No.: US 11,742,966 B2
(45) Date of Patent: Aug. 29, 2023

(54) METHOD AND APPARATUS FOR DETERMINING WEAK WI-FI SIGNAL, STORAGE MEDIUM AND TERMINAL

(71) Applicant: SPREADTRUM COMMUNICATIONS (SHANGHAI) CO., LTD., Shanghai (CN)

(72) Inventor: Mingwei Cao, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 17/854,237

(22) Filed: Jun. 30, 2022

(65) Prior Publication Data
US 2022/0360346 A1 Nov. 10, 2022

Related U.S. Application Data

(63) Continuation of application No. PCT/CN2020/113668, filed on Sep. 7, 2020.

(30) Foreign Application Priority Data

Dec. 30, 2019 (CN) .......................... 201911397557.2

(51) Int. Cl.
*H04B 17/318* (2015.01)
*H04W 24/08* (2009.01)
*H04W 84/12* (2009.01)

(52) U.S. Cl.
CPC .......... *H04B 17/318* (2015.01); *H04W 24/08* (2013.01); *H04W 84/12* (2013.01)

(58) Field of Classification Search
CPC ..... H04B 17/318; H04B 17/26; H04W 24/08; H04W 84/12
See application file for complete search history.

(56) References Cited

U.S. PATENT DOCUMENTS

| 8,068,562 B1* | 11/2011 | Zhang .................. H04B 1/7115 375/323 |
| 2008/0212654 A1* | 9/2008 | Nilsson ............... H04J 13/0048 375/E1.003 |

(Continued)

FOREIGN PATENT DOCUMENTS

| CN | 101594167 A | 12/2009 |
| CN | 101707494 A | 5/2010 |

(Continued)

OTHER PUBLICATIONS

CNIPA First Office Action for corresponding CN Application No. 201911397557.2; dated Mar. 25, 2021.

(Continued)

*Primary Examiner* — Jamal Javaid
*Assistant Examiner* — Ryan C Kavleski
(74) *Attorney, Agent, or Firm* — Cantor Colburn LLP

(57) ABSTRACT

A method and apparatus for determining a weak Wi-Fi signal, a storage medium and a terminal are provided. The method includes: receiving a to-be-determined signal; performing energy sliding accumulation based on the to-be-determined signal to obtain accumulated values of energy values at a plurality of sampled value moments including a current sampled value comment, wherein each of the energy values is determined based on an amplitude value of the to-be-determined signal at the corresponding sampled value moment; determining a product value of a first preset energy threshold and an energy value at a preset sampled value moment; and determining whether the to-be-determined signal is a weak Wi-Fi signal at least based on comparison between the accumulated value of the energy values at the current sampled value moment and the product value, wherein the first preset energy threshold is greater than or equal to 1.

17 Claims, 5 Drawing Sheets

(56) References Cited

U.S. PATENT DOCUMENTS

2018/0041978 A1    2/2018  Chang et al.
2021/0099234 A1*   4/2021  Graceffo .............. H04B 10/112
2021/0306963 A1*   9/2021  Lin ................... H04W 72/0473

FOREIGN PATENT DOCUMENTS

| CN | 105911570 A  | 8/2016  |
|----|--------------|---------|
| CN | 106772268 A  | 5/2017  |
| CN | 107181540 A  | 9/2017  |
| CN | 108627861 A  | 10/2018 |
| CN | 111200863 A  | 5/2020  |
| JP | 2002290273 A | 10/2002 |

OTHER PUBLICATIONS

International Search Report for International Application No. PCT/CN2020/113668; dated Dec. 2, 2020.
CNIPA Notification to Grant Patent Right for Invention for corresponding CN Application No. 201911397557.2; dated Aug. 11, 2021.
CNIPA Granted Claims in Notification to Grant Patent Right for Invention (Chinese Priority CN201911397557.2) dated Aug. 11, 2021 with translation certificate.

* cited by examiner

METHOD AND APPARATUS FOR DETERMINING WEAK WI-FI SIGNAL, STORAGE MEDIUM AND TERMINAL

CROSS-REFERENCE TO RELATED APPLICATIONS

This application is a continuation under 35 U.S.C. § 120 of PCT/CN2020/113668, filed Sep. 7, 2020, which is incorporated herein by reference, and which claimed priority to Chinese Application No. 201911397557.2, filed Dec. 30, 2019. The present application likewise claims priority under 35 U.S.C. § 119 to Chinese Application No. 201911397557.2, filed Dec. 30, 2019, the entire content of which is also incorporated herein by reference.

TECHNICAL FIELD

The present disclosure generally relates to communication technology field, and more particularly, to a method and apparatus for determining a weak Wi-Fi signal, a storage medium and a terminal.

BACKGROUND

For Wi-Fi and other burst communication systems, signals are generally transmitted independently in frames. Consequently, it is not known when a frame of signal to be received will arrive, and thus a header of the frame must be detected in time, and an analog gain of a receiver should be adjusted to an appropriate value to ensure subsequent reception and demodulation. For example, an Automatic Gain Control (AGC) module is used to achieve the above functions.

For receiving relatively strong signals, the frame header can be caught simply by energy detection. However, for the burst communication systems, such as Bluetooth, Wi-Fi (802.11a/b/g/n/ac/ax) systems, to ensure operation in a relatively long distance or a severely blocked environment, it is necessary to provide relatively high receiving sensitivity. A Signal-to-Noise Ratio (SNR) is small or even negative around the sensitivity, that is, the signal is comparable to or even weaker than noises. For weak signals, when the signal is comparable to or even weaker than the noises, it is difficult to conduct energy detection. If an energy detection threshold is slightly higher, it is probable to occur missed detection; and if the energy detection threshold is slightly lower, it is probable to occur false detection, which also seriously affects operation of the AGC.

Due to characteristics of a Wi-Fi signal frame, that is, Bus signal at a front end of a frame header is formed by a repetition of ten 0.8 us signals. That is, the frame header signal is repeated periodically with a period of 0.8 us and a repetition time of 10. Therefore, for receiving weak signals, in existing techniques, the frame header is generally detected by obtaining a sliding correlation between front and rear signals.

SUMMARY

Embodiments of the present disclosure may provide a method and apparatus for determining a weak Wi-Fi signal, a storage medium and a terminal, which may effectively reduce power consumption when receiving weak Wi-Fi signals.

In an embodiment of the present disclosure, a method for determining a weak Wi-Fi signal is provided, including: receiving a to-be-determined signal; performing energy sliding accumulation based on the to-be-determined signal to obtain accumulated values of energy values at a plurality of sampled value moments including a current sampled value comment, wherein each of the energy values is determined based on an amplitude value of the to-be-determined signal at the corresponding sampled value moment; determining a product value of a first preset energy threshold and an energy value at a preset sampled value moment; and determining whether the to-be-determined signal is a weak Wi-Fi signal at least based on comparison between the accumulated value of the energy values at the current sampled value moment and the product value, wherein the first preset energy threshold is greater than or equal to 1.

In an embodiment of the present disclosure, a storage medium having computer instructions stored therein is provided, wherein when the computer instructions are executed, the above method is performed.

In an embodiment of the present disclosure, a terminal including a memory and a processor is provided, wherein the memory has computer instructions stored therein, and when the processor executes the computer instructions, the above method is performed.

DETAILED DESCRIPTION

As described in the background, for Wi-Fi and other burst communication systems, signals are generally transmitted independently in frames. Consequently, it is not known when a frame of signal to be received will arrive, and thus a header of the frame must be detected in time.

However, for weak signals, when the signal is comparable to or even weaker than the noises, it is difficult to conduct energy detection. If an energy detection threshold is slightly higher, it is probable to result in missed detection; and if the energy detection threshold is slightly lower, it is probable to result in false detection, which also seriously affects operation of the AGC.

Figure 1:
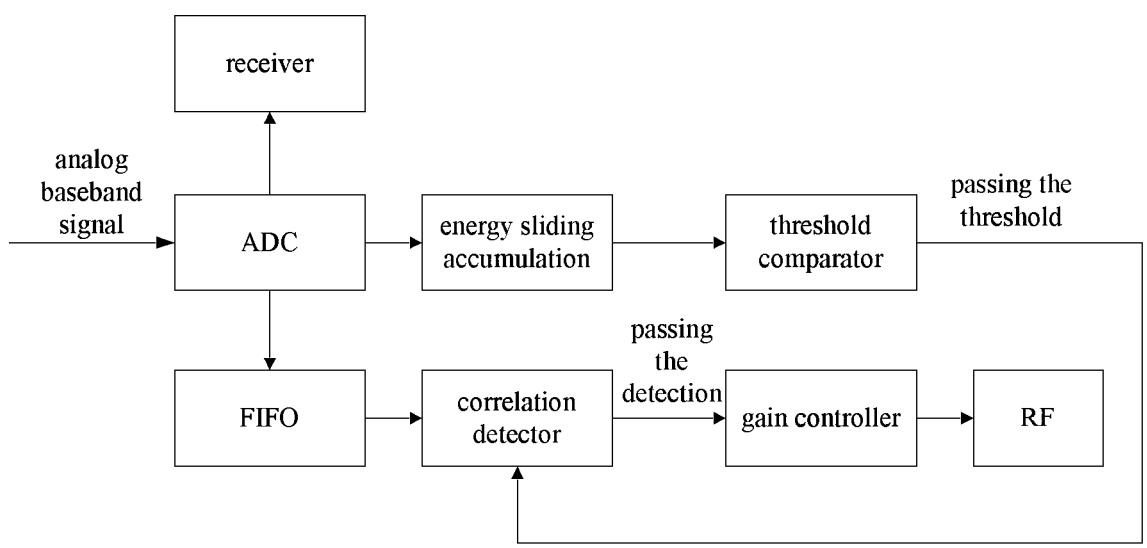
FIG. 1 is a structural diagram of an AGC module in existing techniques.

Referring to FIG. 1, FIG. 1 is a structural diagram of an AGC module in existing techniques.

As shown in FIG. 1, signals are received through an antenna into an RF front-end to be subjected to low-noise amplification, spectrum shifting, filtering, variable gain amplification and other operations to obtain an analog baseband signal. Afterward, the analog baseband signal is input to an Analog to Digital Converter (ADC) and converted to a digital baseband signal which is then input to a receiver for further processing.

Further, the digital baseband signal may be input into an energy sliding accumulator to be subjected to energy sliding accumulation to obtain accumulated values of energy values at a plurality of sampled value moments including a current sampled value moment. The accumulated value of the energy values is input into a threshold comparator to be compared with a preset energy threshold. If the accumulated value of the energy values is less than or equal to the preset energy threshold, it is determined that the digital baseband signal is relatively weak, possibly a weak signal, and then is input to a correlation detector.

When passing detection at the correlation detector, the digital baseband signal is determined to be a weak signal, and a gain controller is triggered to adjust a gain of RF to complete an AGC function.

A FIFO may be set before the correlation detector to store two 0.8 us sampled values. In this way, when the correlation detector starts, the consumed 1.6 us sampled value is still stored in the FIFO, and the correlation detector can use a plurality of 0.8 us to confirm whether this small energy is a target signal to prevent false detection.

Inventors found based on research that, in the existing techniques, the frame header is generally detected by obtaining sliding correlation between front and rear signals, and merely one threshold is set. For cases that the sliding correlation is less than the threshold, it is considered that detection is required, that is, whether there is a signal or not, the AGC needs to perform both energy detection and sliding correlation detection, resulting in excessive power consumption of the AGC module.

In embodiments of the present disclosure, a to-be-determined signal is received, energy sliding accumulation is performed based on the to-be-determined signal to obtain accumulated values of energy values at a plurality of sampled value moments including a current sampled value comment, wherein each of the energy values is determined based on an amplitude value of the to-be-determined signal at the corresponding sampled value moment, a product value of a first preset energy threshold and an energy value at a preset sampled value moment is determined, and whether the to-be-determined signal is a weak Wi-Fi signal is determined at least based on comparison between the accumulated value of the energy values at the current sampled value moment and the product value, wherein the first preset energy threshold is greater than or equal to 1. With the embodiments of the present disclosure, it is determined whether the to-be-determined signal is a weak Wi-Fi signal at least based on comparison between the accumulated value of the energy values at the current sampled value moment and the product value. By setting the threshold for comparison, it is additionally determined whether energy becomes larger. When it is detected that the energy becomes significantly larger, it is determined that there is a small energy arrival, and a relevant detector is activated to determine whether it is the target signal, avoiding power consumption in a situation that the energy does not become larger, thereby effectively reducing power consumption.

In order to clarify the objects, characteristics and advantages of the disclosure, embodiments of present disclosure will be described in detail in conjunction with accompanying drawings.

Figure 2:
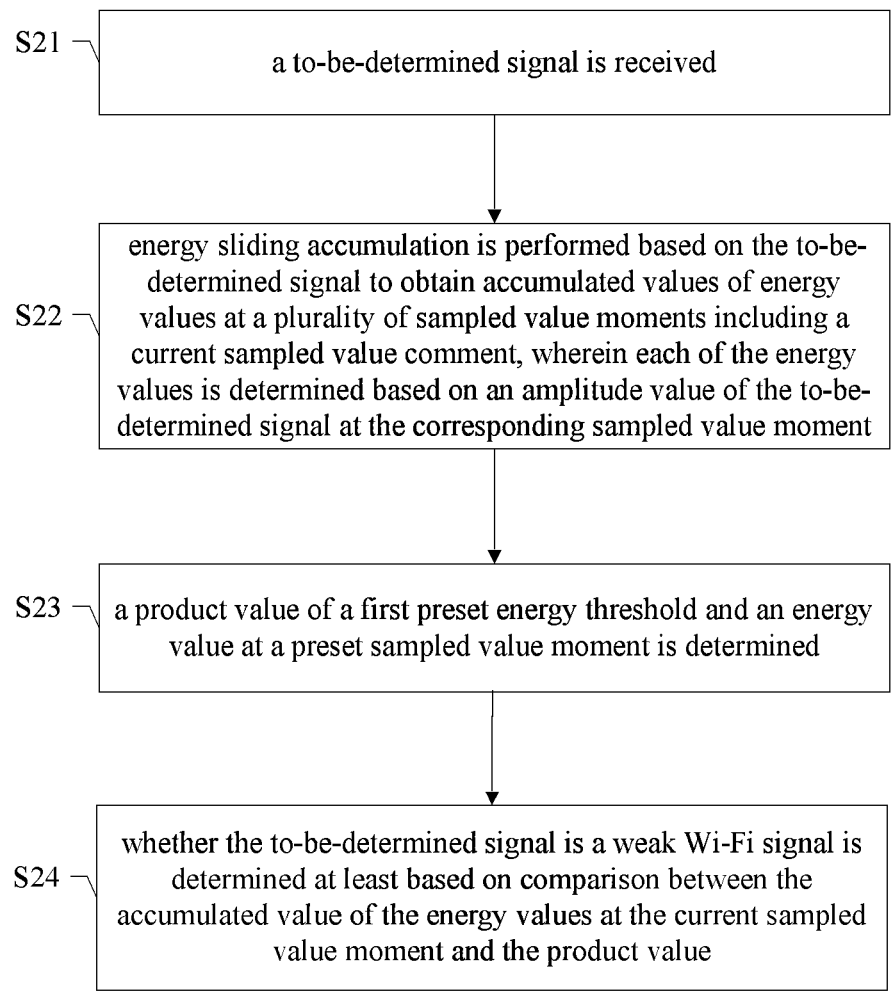
FIG. 2 is a flow chart of a method for determining a weak Fi signal according to an embodiment.

Referring to FIG. 2, FIG. 2 is a flow chart of a method for determining a weak Wi-Fi signal according to an embodiment. The method may include S21 to S24.

In S21, a to-be-determined signal is received.

In S22, energy sliding accumulation is performed based on the to-be-determined signal to obtain accumulated values of energy values at a plurality of sampled value moments including a current sampled value comment, wherein each of the energy values is determined based on an amplitude value of the to-be-determined signal at the corresponding sampled value moment.

In S23, a product value of a first preset energy threshold and an energy value at a preset sampled value moment is determined.

In S24, whether the to-be-determined signal is a weak Wi-Fi signal is determined at least based on comparison between the accumulated value of the energy values at the current sampled value moment and the product value.

The first preset energy threshold is greater than or equal to 1.

In some embodiments, in S21, the to-be-determined signal may be an analog baseband signal or a digital baseband signal.

Specifically, a signal may be received through an antenna into an RF front-end, and the subjected to operations such as low-noise amplification, spectrum shifting, filtering, and variable gain amplification to obtain the analog baseband signal.

In some embodiments, in S22, energy sliding accumulation is performed based on the to-be-determined signal to obtain accumulated values of energy values at a plurality of sampled value moments including a current sampled value comment.

The energy value is determined according to an amplitude value of the to-be-determined signal at the corresponding sampled value moment. For example, the energy value is the amplitude value.

Figure 3:
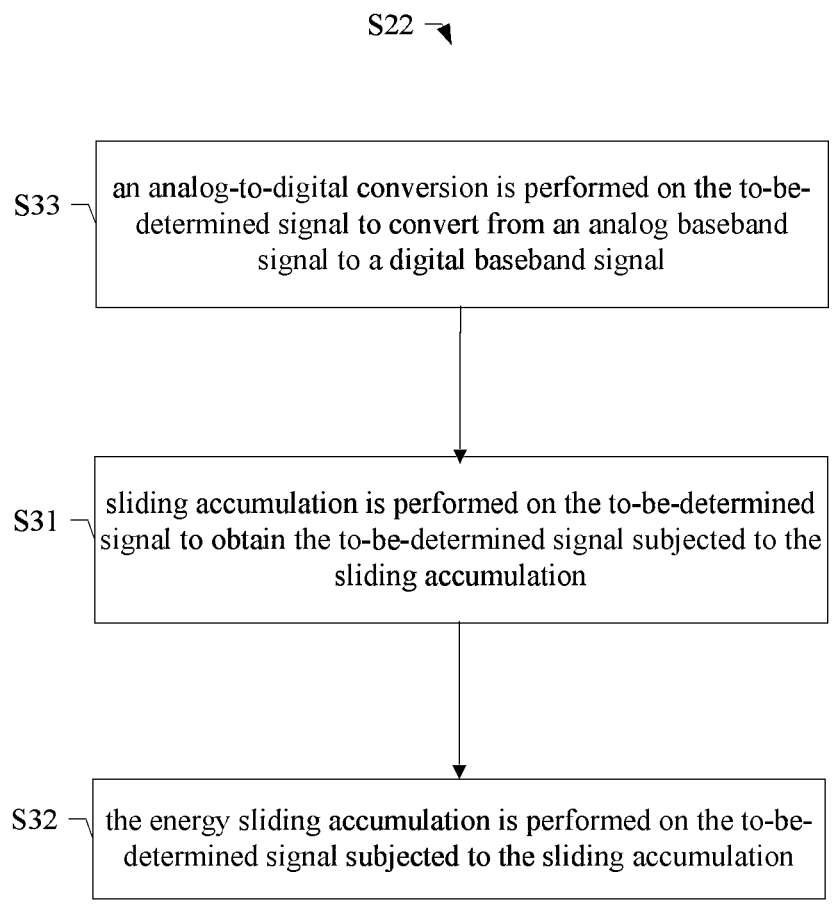
FIG. 3 is a flow chart of S22 as shown in FIG. 2 according to an embodiment.

FIG. 3 is a flow chart of S22 as shown in FIG. 2 according to an embodiment. Said performing energy sliding accumulation based on the to-be-determined signal may include S31 and S32.

In S31, sliding accumulation is performed on the to-be-determined signal to obtain the to-be-determined signal subjected to the sliding accumulation.

In some embodiments, every time a sampled point is slid, the sliding accumulation is performed on the to-be-determined signal based on a following formula to obtain the to-be-determined signal subjected to the sliding accumulation:

$$X(k)=S(k)+S(k-N),$$

where $k=0, 1, -N$, $X(k)$ is the to-be-determined signal subjected to the sliding accumulation, N is a multiple of a number of sampled value moments in each cycle of the weak Wi-Fi signal, and $S(k)$ is the to-be-determined signal at a sampled value moment k.

In an existing Wi-Fi signal frame, the first Bus signal at a front end of a frame header is formed by a repetition of ten 0.8 us signals. That is, the frame header signal is repeated periodically with a period of 0.8 us and a repetition time of 10. It could be understood that a sliding adder may add a current 0.8 us digital signal and a previous 0.8 us signal every time a sampled point is slid.

Take a system with a bandwidth of 20 MHz and a sampling rate of 20 MHz for example, where a slide occurs every 50 ns. Addition is performed to 32 sampled points before a current moment in a time order.

Letting the sampled signal be $S(n)$, $n=0, -1, -2, \ldots n$ represents a sampled time, the to-be-determined signal subjected to the sliding accumulation may be determined by a following formula:

$$X(k)=S(k)+S(k-16), k=0,-1,\ldots,-15,$$

where sums of sampled values at k=0, −1, . . . , −15 and sampled values at k=−16, −17, . . . , −31 are obtained, respectively.

Similarly, at a next sampled time, the to-be-determined signal subjected to the sliding accumulation may be determined by a following formula:

X(k+1)=S(k+1)+S(k−15),k=0,−1, . . . ,−15.

It should be noted that if the to-be-determined signal is an analog baseband signal, an analog-to-digital conversion needs to be performed.

In some embodiments, prior to performing the sliding accumulation on the to-be-determined signal, the method further includes S33 of performing an analog-to-digital conversion on the to-be-determined signal to convert from an analog baseband signal to a digital baseband signal.

In S32, the energy sliding accumulation is performed on the to-be-determined signal subjected to the sliding accumulation.

In some embodiments, the energy sliding accumulation is performed based on the to-be-determined signal using a following formula to obtain the accumulated values of the energy values at the plurality of sampled value moments including the current sampled value comment:

$$E(1) = \sum_{m=l-15}^{l} \left|\frac{1}{2}X(m)\right|^2,$$

where l=0, −1, −N, m=0, −1, −N, X(m) is the to-be-determined signal subjected to sliding accumulation, N is a multiple of a number of sampled value moments in each cycle of the weak Wi-Fi signal, and E(1) is the accumulated value of the energy values at a lth sampled value moment.

It should be noted that, for Wi-Fi signals, N=16.

As the first 8 us of the signal frame of the Wi-Fi signal is periodic, it is equivalent to adding two 0.8 us signals. As the Wi-Fi signal has periodicity, for a signal part, after superimposing and dividing by 2, energy may be enhanced, ideally, by 3 dB, and for a non-signal part, as there is no periodicity, the energy may not be enhanced after summing and averaging.

From above, when a signal arrives, the above formula can be used to detect a situation where the energy is significantly enhanced.

In the embodiments, during energy detection, every time a sampled point is slid, sliding accumulation may be performed to obtain the to-be-determined signal subjected to the sliding accumulation. As the weak Wi-Fi signal is periodic, the energy is enhanced after signals are superimposed, which helps to improve identification and accuracy of detection of the signals. Further, compared with an existing method where multiplication calculation in original sliding correlation is performed continuously, the embodiments of the present disclosure replace the multiplication calculation in the sliding correlation with the addition calculation in the sliding accumulation, thereby improving operation efficiency.

Alternatively, the value at a following sampled time may be obtained based on the value at a previous sampled time using a simpler calculation method, thereby reducing operation complexity.

In some embodiments, said performing energy sliding accumulation based on the to-be-determined signal to obtain accumulated values of energy values at a plurality of sampled value moments including a current sampled value comment includes: obtaining the accumulated value of the energy values at a lth sampled value moment based on a following formula:

$$E(1) = \sum_{m=l-15}^{l} \left|\frac{1}{2}X(m)\right|^2;$$

and sequentially obtaining the accumulated value of the energy values at remaining sampled value moments from a (l+1)th sampled value moment based on a following formula:

$$E(l+1) = \sum_{m=l-14}^{l+1} \left|\frac{1}{2}X(m)\right|^2 = E(l) + \left|\frac{1}{2}X(l+1)\right|^2 - \left|\frac{1}{2}X(l-15)\right|^2,$$

where l=0, −1, −N, m=0, −1, −N, X(m) is the to-be-determined signal subjected to sliding accumulation, N is a multiple of a number of sampled value moments in each cycle of the weak Wi-Fi signal, E(1) is the accumulated value of the energy values at a lth sampled value moment, and E(l+1) is the accumulated value of the energy values at the (l+1)th sampled value moment.

It could be understood that, for each sliding, two complex modulo squares are required, i.e., a total of 4 real multiplication calculations, and an operation of dividing by 2 may be performed by simply shifting 1 bit to the right.

It should be noted that, in the embodiments of the present disclosure, the result of the sliding adder may be processed based on a following formula:

$$\frac{X(k+16) + X(k)}{2},$$

and a processed result is output to a sliding energy accumulator.

In the embodiments of the present disclosure, with the above operations, the energy may be enhanced when the signal arrives, and the correlation detection is performed only when the energy becomes larger, so as to avoid power consumption when the energy does not become larger, thereby effectively reducing power consumption.

Still referring to FIG. 2, in some embodiments, in S23, the product value of the first preset energy threshold and the energy value at a preset sampled value moment is determined, where Th2 is the first preset energy threshold value, E(j−T) is the energy value at the preset sampled value moment (j−T), and T is a preset duration.

The first preset energy threshold is greater than or equal to 1, so the product value is greater than or equal to the energy value at the preset sampled value moment (j−T).

In some embodiments, in S24, whether the to-be-determined signal is a weak Wi-Fi signal is determined at least based on comparison between the accumulated value of the energy values at the current sampled value moment and the product value.

Figure 4:
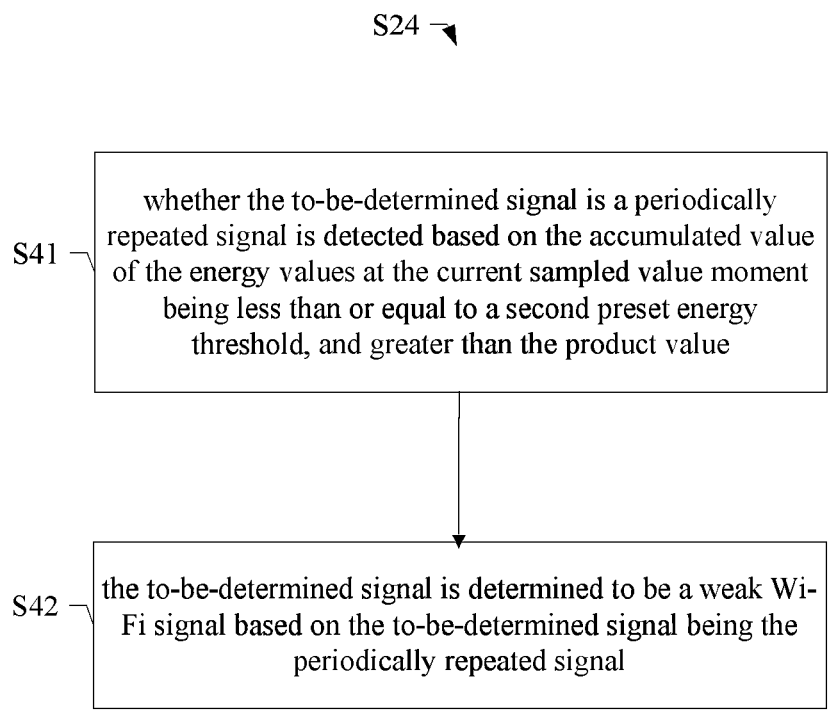
FIG. 4 is a flow chart of S24 as shown in FIG. 2 according to an embodiment.

FIG. 4 is a flow chart of S24 as shown in FIG. 2 according to an embodiment. Said determining whether the to-be-determined signal is a weak Wi-Fi signal at least based on comparison between the accumulated value of the energy values at the current sampled value moment and the product value may include S41 and S42.

In S41, whether the to-be-determined signal is a periodically repeated signal is detected based on the accumulated value of the energy values at the current sampled value moment being less than or equal to a second preset energy threshold, and greater than the product value.

In some embodiments, the accumulated value of the energy values at the sampled value moment may be input into a first threshold comparator to be compared with a second preset energy threshold. If the accumulated value of the energy values at the current sampled value moment is less than or equal to the second preset energy threshold, it is preliminarily considered that the Wi-Fi signal may be a weak signal.

Specifically, the threshold of the first threshold comparator may be set as the second preset energy threshold Th1, and at any point in time j, if $E(j)>Th1$ it can be determined that there is a strong signal coming, and the gain controller is activated to adjust a gain of RF to complete AGC. The first threshold comparator can be used to quickly respond to a strong signal and performs energy trigger rapidly and adjusts the gain when the strong signal arrives.

Further, a threshold of a second threshold comparator is set as the product value $Th2 \times E(j-T)$. If failing in passing the first threshold comparator, the second threshold comparator is entered. If $E(j)>Th2 \cdot E(j-T)$, it is determined that the energy at the time point j is significantly larger than that at the time point (j-T), and thus there is a small energy coming. Accordingly, the correlation detector may be activated to determine whether it is a target signal.

Further, said detecting whether the to-be-determined signal is a periodically repeated signal includes determining the to-be-determined signal to be the periodically repeated signal based on consecutive 0.8 us signals having same content.

In some embodiments, a correlation detector may be used to determine whether the to-be-determined signal is a periodic repetition signal. In the embodiments of the present disclosure, specific implementation of the correlation detector is not limited.

In S42, the to-be-determined signal is determined to be a weak Wi-Fi signal based on the to-be-determined signal being the periodically repeated signal.

In embodiments of the present disclosure, based on the accumulated value of the energy values at the current sampled value moment being less than or equal to the second preset energy threshold, and greater than the product value, and the to-be-determined signal being a periodically repeated signal, the to-be-determined signal is determined to be a weak Wi-Fi signal. Therefore, it is possible to identify a strong signal with sufficient energy. As the strong signal can be locked by energy triggering without using energy detection and correlation detection, in the embodiments of the present disclosure, correlation detection is merely performed on weak signals on the basis of identify the strong signal, which effectively reduces power consumption.

In some embodiments, prior to said detecting whether the to-be-determined signal is a periodically repeated signal, the method further includes inputting the to-be-determined signal into a FIFO module to store sampled values of a preset number of 0.8 us signals.

Specifically, the FIFO may be used to store sampled values for two 0.8 us. In this way, when the correlation detector starts, sampled values for the consumed 1.6 us are still stored in the FIFO, and the correlation detector may use multiple 0.8 us to confirm whether the small energy is the target signal to prevent false detection.

In embodiments of the present disclosure, it is determined whether the to-be-determined signal is a weak Wi-Fi signal at least based on comparison between the accumulated value of the energy values at the current sampled value moment and the product value. Therefore, it is additionally determined whether energy becomes larger. Correlation detection is performed merely when the energy becomes larger, avoiding power consumption in a situation that the energy does not become larger, thereby effectively reducing power consumption.

In some embodiments, the method further includes performing gain control on the weak Wi-Fi signal and inputting the weak Wi-Fi signal subjected to the gain control to an RF module.

In some embodiments, when passing detection at the correlation detector, the to-be-determined signal is determined to be a weak signal, and a gain controller is triggered to adjust a gain of RF to complete an AGC function.

Figure 5:
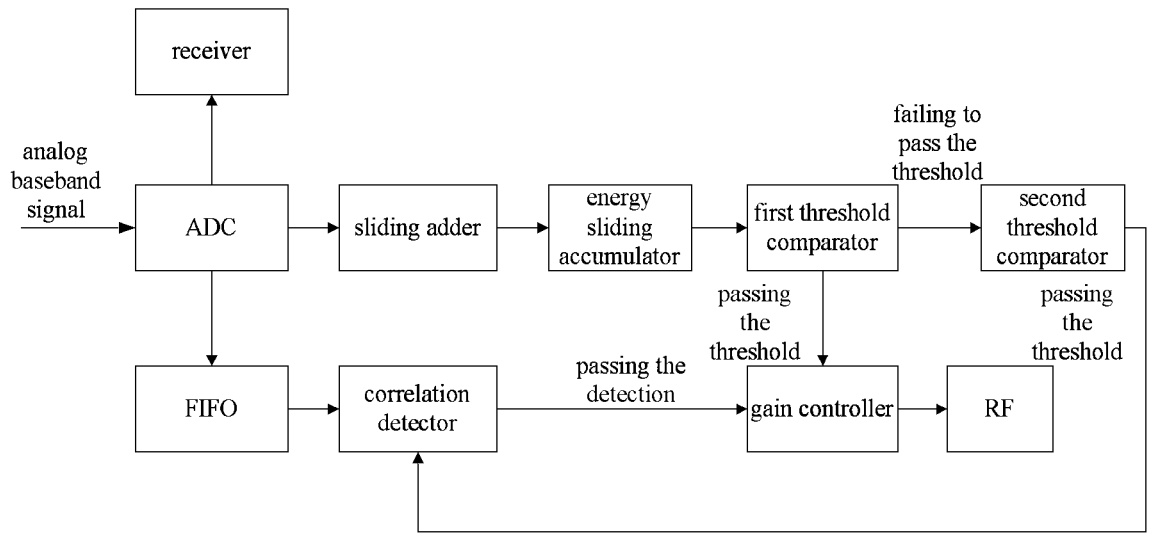
FIG. 5 is a structural diagram of an AGC module according to an embodiment.

Referring to FIG. 5, FIG. 5 is a structural diagram of an AGC module according to an embodiment.

As shown in FIG. 5, an analog baseband signal is input to an ADC and converted into a digital baseband signal which may be input to a receiver for processing.

Afterward, the digital baseband signal may be input into a sliding adder for sliding addition, and then input into an energy sliding accumulator for energy sliding accumulation, so as to obtain accumulated values of energy values at multiple sampled value moments including a current sampled value moment The accumulated value of the energy values may be input into a first threshold comparator to be compared with a second preset energy threshold. If the accumulated value of the energy values is less than or equal to the second preset energy threshold, it is input to a second threshold comparator, and after passing the threshold, it is determined that the digital baseband signal is relatively weak, possibly a weak signal, and thus the digital baseband signal is input into a correlation detector.

When passing detection of the correlation detector, it is determined that it is a weak signal, and a gain controller is triggered to complete an AGC function.

Further, the to-be-determined signal may be input into the FIFO module to store sampled values of a preset number of 0.8 us signal for direct access by the correlation detector during detection.

Principles, specific implementation, and beneficial effects of the AGC module may be referred to the above related descriptions of the method as shown in FIG. 2 to FIG. 4 and are not repeated here.

Figure 6:
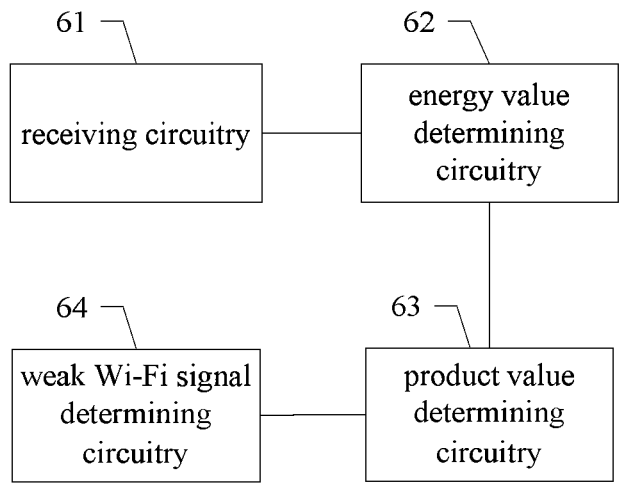
FIG. 6 is a structural diagram of an apparatus for determining a weak Wi-Fi signal according to an embodiment.

Referring to FIG. 6, FIG. 6 is a structural diagram of an apparatus for determining a weak Wi-Fi signal according to an embodiment.

The apparatus includes: a receiving circuitry 61 configured to receive a to-be-determined signal; an energy value determining circuitry 62 configured to perform energy sliding accumulation based on the to-be-determined signal to obtain accumulated values of energy values at a plurality of sampled value moments including a current sampled value comment, wherein each of the energy values is determined based on an amplitude value of the to-be-determined signal at the corresponding sampled value moment; a product value determining circuitry 63 configured to determine a product value of a first preset energy threshold and an energy value at a preset sampled value moment; and a weak Wi-Fi signal determining circuitry 64 configured to determine whether the to-be-determined signal is a weak Wi-Fi signal at least based on comparison between the accumulated value of the energy values at the current sampled value moment and the product value, wherein the first preset energy threshold is greater than or equal to 1.

Principles, specific implementation, and beneficial effects of the apparatus may be referred to the above related descriptions of the method as shown in FIG. 2 to FIG. 4 and are not repeated here.

In an embodiment of the present disclosure, a storage medium having computer instructions stored therein is provided, wherein when the computer instructions are executed, the above method is performed. In some embodiments, the storage medium may be a computer readable storage medium and may include a non-volatile or a non-transitory memory, or include an optical disk, a mechanical hard disk, or a solid hard disk.

In the embodiments of the present disclosure, the processor may be a Central Processing Unit (CPU), or other general processors, Digital Signal Processors (DSPs), Application Specific Integrated Circuits (ASICs), Field Programmable Gate Arrays (FPGAs) or other Programmable logic devices, discrete gates or transistor logic devices, discrete hardware components, and the like. A general processor may be a microprocessor, or the processor may be any conventional processor or the like.

It should also be understood that the memory in the embodiments of the present disclosure may be either volatile memory or nonvolatile memory or may include both volatile and nonvolatile memories. The non-volatile memory may be a Read-Only Memory (ROM), a Programmable ROM (PROM), an Erasable PROM (EPROM), an electrically Erasable EPROM (EEPROM), or a flash memory. The volatile memory may be a Random Access Memory (RAM) which functions as an external cache. By way of example but not limitation, various forms of RAM are available, such as Static Random Access Memory (SRAM), Dynamic Random Access Memory (DRAM), Synchronous Dynamic Random Access Memory (SDRAM), Double Data Rate Synchronous Dynamic Random Access Memory (DDR SDRAM), Enhanced SDRAM (ESDRAM), Synchronous connection to DRAM (SLDRAM), and Direct Rambus RAM (DR-RAM).

In an embodiment of the present disclosure, a terminal including a memory and a processor is provided, wherein the memory has computer instructions stored therein, and when the processor executes the computer instructions, the above method is performed. The terminal may include but not limited to a mobile phone, a computer, or a tablet computer.

A terminal in the embodiments of the present disclosure may refer to various forms of UE, access terminal, user unit, user station, Mobile Station (MS), remote station, remote terminal, mobile equipment, user terminal, terminal equipment, wireless communication equipment, user agent or user device. The terminal equipment may further be a cellular phone, a cordless phone, a Session Initiation Protocol (SIP) phone, a Wireless Local Loop (WLL) station, a Personal Digital Assistant (PDA), a handheld device with a wireless communication function, a computing device or other processing devices connected to a wireless modems, an in-vehicle device, a wearable device, a terminal equipment in the future 5G network, or a terminal equipment in a future evolved Public Land Mobile Network (PLMN), which is not limited in the embodiments of the present disclosure.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A method for determining a weak Wi-Fi signal, comprising:
   receiving a to-be-determined signal;
   performing sliding addition on the to-be-determined signal;
   performing sliding accumulation of energy of the to-be-determined signal subjected to the sliding addition, to obtain accumulated values of energy values at a plurality of sampled value moments comprising a current sampled value moment, wherein each of the energy values is determined based on an amplitude value of the to-be-determined signal subjected to the sliding addition at the corresponding sampled value moment;
   determining a product value of a first preset energy threshold and an energy value at a preset sampled value moment; and
   determining whether the to-be-determined signal is a weak Wi-Fi signal at least based on comparison between the accumulated value of the energy values at the current sampled value moment and the product value,
   wherein the first preset energy threshold is greater than or equal to 1,
   wherein said determining whether the to-be-determined signal is a weak Wi-Fi signal at least based on comparison between the accumulated value of the energy values at the current sampled value moment and the product value comprises:
      detecting whether the to-be-determined signal is a periodically repeated signal based on the accumulated value of the energy values at the current sampled value moment being less than or equal to a second preset energy threshold, and greater than the product value; and
      determining the to-be-determined signal to be a weak Wi-Fi signal based on the to-be-determined signal being the periodically repeated signal.

2. The method according to claim 1, wherein the sliding addition is performed on the to-be-determined signal based on the to-be-determined signal at a sampled value moment k and a sliding window N to obtain the to-be-determined signal subjected to the sliding addition, where N is a multiple of a number of sampled value moments in each cycle of the weak Wi-Fi signal.

3. The method according to claim 1, wherein prior to performing the sliding addition on the to-be-determined signal, the method further comprises:
   performing an analog-to-digital conversion on the to-be-determined signal to convert from an analog baseband signal to a digital baseband signal.

4. The method according to claim 1, wherein prior to said detecting whether the to-be-determined signal is a periodically repeated signal, the method further comprises:
   inputting the to-be-determined signal into a First Input First Output (FIFO) module to store sampled values of a preset number of 0.8 us signals.

5. The method according to claim 1, wherein said detecting whether the to-be-determined signal is a periodically repeated signal comprises:
   determining the to-be-determined signal to be the periodically repeated signal based on consecutive 0.8 us signals having same content.

6. The method according to claim 1, further comprising:
performing gain control on the weak Wi-Fi signal, and inputting the weak signal subjected to the gain control to a Radio Frequency (RF) module.

7. The method according to claim 1, wherein the sliding accumulation of energy is performed based on the to-be-determined signal subjected to sliding addition and a multiple of a number of sampled value moments in each cycle of the weak Wi-Fi signal to obtain the accumulated values of the energy values at the plurality of sampled value moments comprising the current sampled value moment.

8. The method according to claim 1, wherein said performing sliding accumulation of energy of the to-be-determined signal subjected to the sliding addition to obtain accumulated values of energy values at a plurality of sampled value moments comprising a current sampled value moment comprises:
obtaining the accumulated value of the energy values at a lth sampled value moment based on the to-be-determined signal subjected to sliding addition and a multiple of a number of sampled value moments in each cycle of the weak Wi-Fi signal; and
sequentially obtaining the accumulated value of the energy values at remaining sampled value moments from a (l+1)-th sampled value moment based on the to-be-determined signal subjected to sliding addition and the multiple of the number of sampled value moments in each cycle of the weak Wi-Fi signal.

9. A non-transitory storage medium storing one or more programs, the one or more programs comprising computer instructions, which, when executed by a processor, cause the processor to:
receive a to-be-determined signal;
perform sliding addition on the to-be-determined signal;
perform sliding accumulation of energy of the to-be-determined signal subjected to the sliding addition, to obtain accumulated values of energy values at a plurality of sampled value moments comprising a current sampled value moment, wherein each of the energy values is determined based on an amplitude value of the to-be-determined signal subjected to the sliding addition at the corresponding sampled value moment;
determine a product value of a first preset energy threshold and an energy value at a preset sampled value moment; and
determine whether the to-be-determined signal is a weak Wi-Fi signal at least based on comparison between the accumulated value of the energy values at the current sampled value moment and the product value,
wherein the first preset energy threshold is greater than or equal to 1,
wherein said determining whether the to-be-determined signal is a weak Wi-Fi signal at least based on comparison between the accumulated value of the energy values at the current sampled value moment and the product value comprises:
detecting whether the to-be-determined signal is a periodically repeated signal based on the accumulated value of the energy values at the current sampled value moment being less than or equal to a second preset energy threshold, and greater than the product value; and
determining the to-be-determined signal to be a weak Wi-Fi signal based on the to-be-determined signal being the periodically repeated signal.

10. The non-transitory storage medium according to claim 9, wherein the sliding addition is performed on the to-be-determined signal based on the to-be-determined signal at a sampled value moment k and a sliding window N to obtain the to-be-determined signal subjected to the sliding addition, where N is a multiple of a number of sampled value moments in each cycle of the weak Wi-Fi signal.

11. The non-transitory storage medium according to claim 9, wherein prior to performing the sliding addition on the to-be-determined signal, the processor is further caused to:
perform an analog-to-digital conversion on the to-be-determined signal to convert from an analog baseband signal to a digital baseband signal.

12. The non-transitory storage medium according to claim 9, wherein prior to said detecting whether the to-be-determined signal is a periodically repeated signal, the processor is further caused to:
input the to-be-determined signal into a First Input First Output (FIFO) module to store sampled values of a preset number of 0.8 us signals.

13. The non-transitory storage medium according to claim 9, wherein said detecting whether the to-be-determined signal is a periodically repeated signal comprises:
determining the to-be-determined signal to be the periodically repeated signal based on consecutive 0.8us signals having same content.

14. The non-transitory storage medium according to claim 9, wherein the processor is further caused to:
perform gain control on the weak Wi-Fi signal, and inputting the weak Wi-Fi signal subjected to the gain control to a Radio Frequency (RF) module.

15. The non-transitory storage medium according to claim 9, wherein the sliding accumulation of energy is performed based on the to-be-determined signal subjected to sliding addition and a multiple of a number of sampled value moments in each cycle of the weak Wi-Fi signal to obtain the accumulated values of the energy values at the plurality of sampled value moments comprising the current sampled value moment.

16. The non-transitory storage medium according to claim 9, wherein said performing energy sliding accumulation of energy of based on the to-be-determined signal subjected to the sliding addition to obtain accumulated values of energy values at a plurality of sampled value moments comprising a current sampled value moment comprises:
obtaining the accumulated value of the energy values at a lth sampled value moment based on the to-be-determined signal subjected to sliding addition and a multiple of a number of sampled value moments in each cycle of the weak Wi-Fi signal; and
sequentially obtaining the accumulated value of the energy values at remaining sampled value moments from a (l+1)th sampled value moment based on the to-be-determined signal subjected to sliding addition and the multiple of the number of sampled value moments in each cycle of the weak Wi-Fi signal.

17. A terminal comprising a memory and a processor, wherein the memory stores one or more programs, the one or more programs comprising computer instructions, which, when executed by the processor, cause the processor to:
receive a to-be-determined signal;
perform sliding addition on the to-be-determined signal;
perform sliding accumulation of energy of the to-be-determined signal subjected to the sliding addition, to obtain accumulated values of energy values at a plurality of sampled value moments comprising a current sampled value moment, wherein each of the energy values is determined based on an amplitude value of the to-be-determined signal subjected to the sliding addition at the corresponding sampled value moment;

determine a product value of a first preset energy threshold and an energy value at a preset sampled value moment; and determine whether the to-be-determined signal is a weak signal at least based on comparison between the accumulated value of the energy values at the current sampled value moment and the product value, wherein the first preset energy threshold is greater or equal to 1, wherein said determining whether the to-be-determined signal is a weak Wi-Fi signal at least based on comparison between the accumulated value of the energy values at the current sampled value moment and the product value comprises:

detecting whether the to-be-determined signal is a periodically repeated signal based on the accumulated value of the energy values at the current sampled value moment being less than or equal to a second preset energy threshold, and greater than the product value; and determining the to-be-determined signal to be a weak Wi-Fi signal based on the to-be-determined signal being the periodically repeated signal.

* * * * *